(12) United States Patent
Wright (10) Patent No.: US 7,963,182 B2
(45) Date of Patent: Jun. 21, 2011

(54) GEAR SHIFT MECHANISM

(75) Inventor: Thomas Owen Wright, Wrexham (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 844 days.

(21) Appl. No.: 11/849,098

(22) Filed: Aug. 31, 2007

(65) Prior Publication Data

US 2008/0053261 A1    Mar. 6, 2008

(30) Foreign Application Priority Data

Sep. 2, 2006 (GB) .................................. 0617365.2

(51) Int. Cl.
*F16H 59/00* (2006.01)
(52) U.S. Cl. ................... 74/335; 74/473.11; 74/473.3
(58) Field of Classification Search ............ 74/335, 74/473.1, 473.11, 473.3
See application file for complete search history.

(56) References Cited

U.S. PATENT DOCUMENTS

| | | | |
|---|---|---|---|
| 2,349,297 A * | 5/1944 | Neracher et al. ............. 74/346 |
| 2,878,691 A * | 3/1959 | Schjolin ........................... 477/6 |
| 2,953,942 A | 9/1960 | Schwartz et al. |
| 2,972,901 A | 2/1961 | Gerst |
| 3,228,502 A | 1/1966 | Gadd |
| 3,319,745 A | 5/1967 | Hilpert |
| 3,675,508 A | 7/1972 | Blank |
| 3,916,714 A | 11/1975 | Sisson et al. |
| 4,063,464 A | 12/1977 | Crabb |
| 4,068,537 A * | 1/1978 | Wolfe ..................... 74/473.11 |
| 4,627,302 A | 12/1986 | Laylock et al. |
| 4,721,002 A | 1/1988 | Horii |
| 4,722,237 A * | 2/1988 | McNinch, Jr. ................. 74/346 |
| 4,785,682 A | 11/1988 | Nishimura et al. |
| 4,877,116 A | 10/1989 | Horsch |
| 5,007,299 A | 4/1991 | Bulgrien |
| 5,181,431 A | 1/1993 | Zaiser |
| RE34,260 E * | 5/1993 | Markyvech et al. ............ 74/335 |
| 5,222,404 A * | 6/1993 | Stine ............................... 74/335 |
| 5,251,132 A | 10/1993 | Bulgrien |

(Continued)

FOREIGN PATENT DOCUMENTS

DE          3410802       10/1984

(Continued)

OTHER PUBLICATIONS

GB Search Report from GB Application No. 0617365.2, dated Dec. 14, 2006.

(Continued)

*Primary Examiner* — Ha D. Ho
(74) *Attorney, Agent, or Firm* — Greenlee Sullivan PC (57) ABSTRACT

A power-assisted gearshift mechanism for a manual transmission, comprising a shift rail mounted for axial movement to select one or more gears, a control arm engageable with the shift rail to cause axial movement of the shift rail in response to operation of a operator control, and a fluid pressure actuator, the fluid pressure actuator comprising a piston moveable in a cylinder, wherein fluid pressure in the cylinder causes force to be applied to the shift rail, the cylinder having a fluid supply connection and a fluid exit connection, and wherein the fluid exit connection is closeable to cause the fluid pressure within the cylinder to change, and the fluid exit connection comprising a bore within the shift rail, wherein movement of the control linkage is operable to open or close the bore.

14 Claims, 5 Drawing Sheets

U.S. PATENT DOCUMENTS

| | | | |
|---|---|---|---|
| 6,000,294 | A | 12/1999 | Jackson et al. |
| 6,209,407 | B1 | 4/2001 | Heinzel et al. |
| 6,250,171 | B1 | 6/2001 | Sperber et al. |
| 6,491,604 | B1 | 12/2002 | Katou et al. |
| 2008/0081738 | A1 | 4/2008 | Earp et al. |

FOREIGN PATENT DOCUMENTS

| | | |
|---|---|---|
| DE | 10232837 | 2/2004 |
| EP | 0087681 | 9/1983 |
| EP | 0354890 | 2/1990 |
| GB | 10256000 | 4/1966 |
| GB | 1190972 | 5/1970 |
| GB | 2024965 | 1/1980 |
| GB | 2271821 | 4/1994 |
| GB | 0619502 | 10/2006 |
| GB | 0714320 | 7/2007 |
| WO | WO2004/076888 | 2/2004 |
| WO | WO2006/056375 | 6/2006 |
| WO | WO2008/116562 | 10/2008 |

OTHER PUBLICATIONS

Examination Report dated Aug. 12, 2010 for GB 071683.3, dated Aug. 12, 2010.
Search Report for GB 071683.3, dated Dec. 11, 2007.
European Search Opinion for EP 07 25 3432.4, dated Mar. 30, 2010.
European Search Report for EP 07 25 3432.4, dated Mar. 30, 2010.

* cited by examiner

GEAR SHIFT MECHANISM

CROSS-REFERENCE TO RELATED APPLICATIONS

This application claims priority under 35 USC 119 (a)-(d) to United Kingdom Patent Application No. GB 0617365.2 filed on Sep. 2, 2006, which is incorporated by reference in its entirety herein.

BACKGROUND TO THE INVENTION

This invention relates to a power assisted gear shift mechanism for a manual transmission and a transmission having such a gear shift mechanism.

In a conventional manual transmission, the operator is able to select a particular gear or torque path through the transmission by operating a gear lever. This operates a mechanism to act physically on the appropriate synchroniser within the gearbox to provide the desired gear. The operator has to apply sufficient force to the gear lever to enable the clutches in the synchroniser to operate effectively. In some cases, this can require a long gear lever to provide the driver with the appropriate mechanical advantage to apply sufficient force to synchromesh clutches, resulting in the operator having to move the lever over the greater distance. A long gear lever thus provides a noticeable delay in the gear being selected, due to the greater distance over which the lever is moved by the operator.

An aim of the invention is to reduce or overcome one or more of the above problems.

SUMMARY OF THE INVENTION

According to a first aspect of the invention, we provide a power-assisted gearshift mechanism for a manual transmission, comprising a shift rail mounted for axial movement to select one or more gears, a control arm engageable with the shift rail to cause axial movement of the shift rail in response to operation of a operator control, and a fluid pressure actuator, the fluid pressure actuator comprises a piston moveable in a cylinder, wherein fluid pressure in the cylinder causes force to be applied to the shift rail, the cylinder having a fluid supply connection and a fluid exit connection, and wherein the fluid exit connection is closeable to cause the fluid pressure within the cylinder to change, and the fluid exit connection comprising a bore within the shift rail, wherein movement of the control linkage is operable to open or close the bore.

The fluid exit connection may be closeable to cause the fluid pressure within the cylinder to increase.

The control arm may comprise an end part engageable with a control part of the shift rail wherein movement of the end part closes an outlet of the bore.

The control part may comprise a block having a recess in which the end part of the control arm may be received and wherein the outlet of the bore may be located with the recess.

An end part of the shift rail may provide part of the fluid pressure actuator.

The control arm may comprise an end part engageable with a control part of the shift rail, the control part comprising a valve mechanism operable to close an outlet of the bore, wherein movement of the end part may act on the valve mechanism to open the outlet of the bore.

An end part of the actuator may comprise the piston moveably mounted within the cylinder.

The gearshift mechanism may comprise two fluid pressure actuators, each fluid pressure actuator may be operable to apply an axial force to the shift rail in an opposite direction.

The power-assisted gearshift may comprise one or more shift rails, each shift rail being moveable by the control linkage.

According to a second aspect of the invention, we provide a transmission comprising a casing, an input and an output, a gearbox having a plurality of clutches and a gearshift mechanism according to the first aspect of the invention, the gearshift mechanism being operable to cause operation of the clutches to provide a drive path between the input and the output.

The clutches may comprise synchromesh clutches.

The transmission may comprise a supply of hydraulic fluid under pressure, wherein the hydraulic fluid may be supplied to the fluid pressure actuator.

BRIEF DESCRIPTION OF THE DRAWINGS

An embodiment of the invention will now be described by way of example only with reference to the accompanying drawings, wherein.

DETAILED DESCRIPTION OF THE INVENTION

Figure 1:
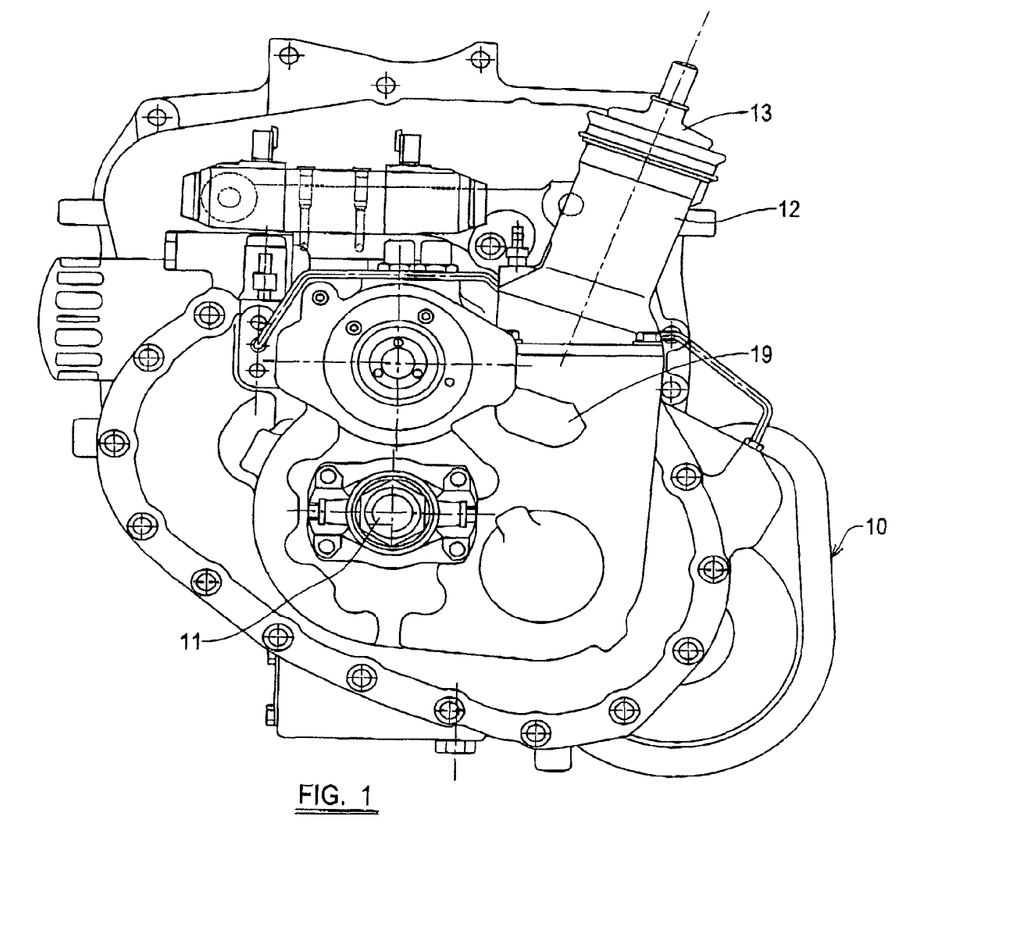
FIG. 1 is an end view of a transmission embodying the present invention.
Figure 2:
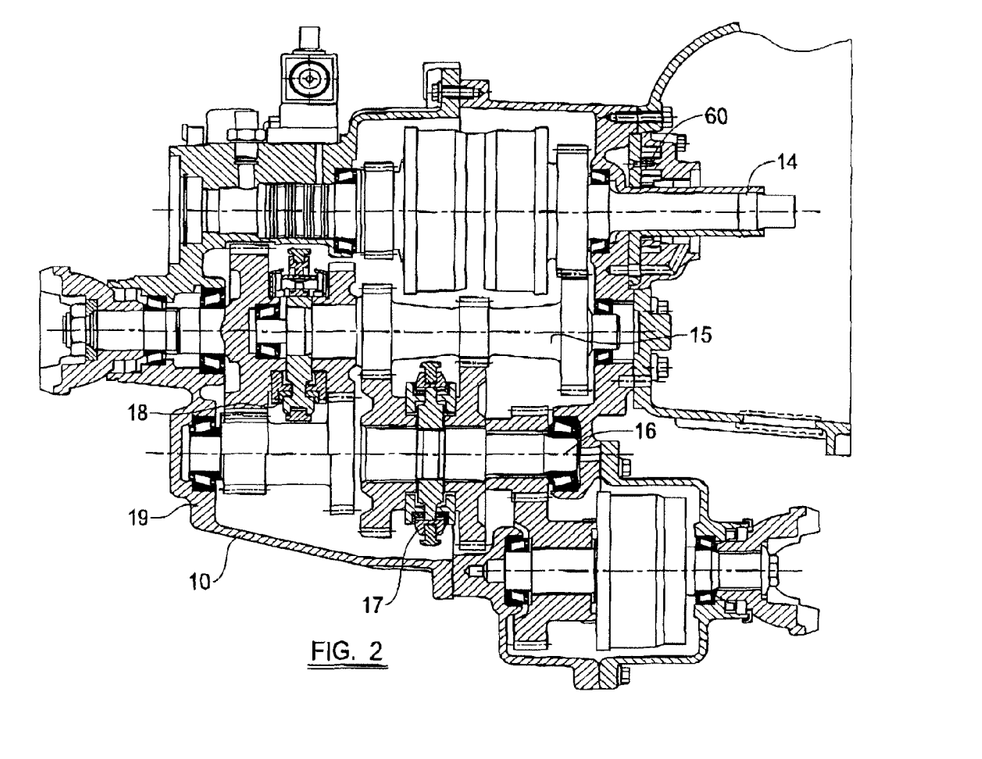
FIG. 2 is a section through the transmission of FIG. 1.

Referring now to FIG. 1, a transmission embodying the invention is generally shown at 10 in end view, comprising a casing 11. A gear lever column 12 projects upwardly of the casing 11 and has a connection 13 at the upper end thereof for connection to a operator control comprising a gear lever of conventional type. As shown in FIG. 2, the transmission 10 has an output connection 13, an input connection 14 for connection to for example a torque converter or directly or indirectly to an engine and a plurality of gears mounted on a first shaft 15 and second shaft 16. The transmission 10 further has a pair of synchro-mesh clutches 17, 18, each of which is operable through the gear shift mechanism described in more detail below to select one of forward or reverse drive paths through the transmission 10.

Figures 3, 4:
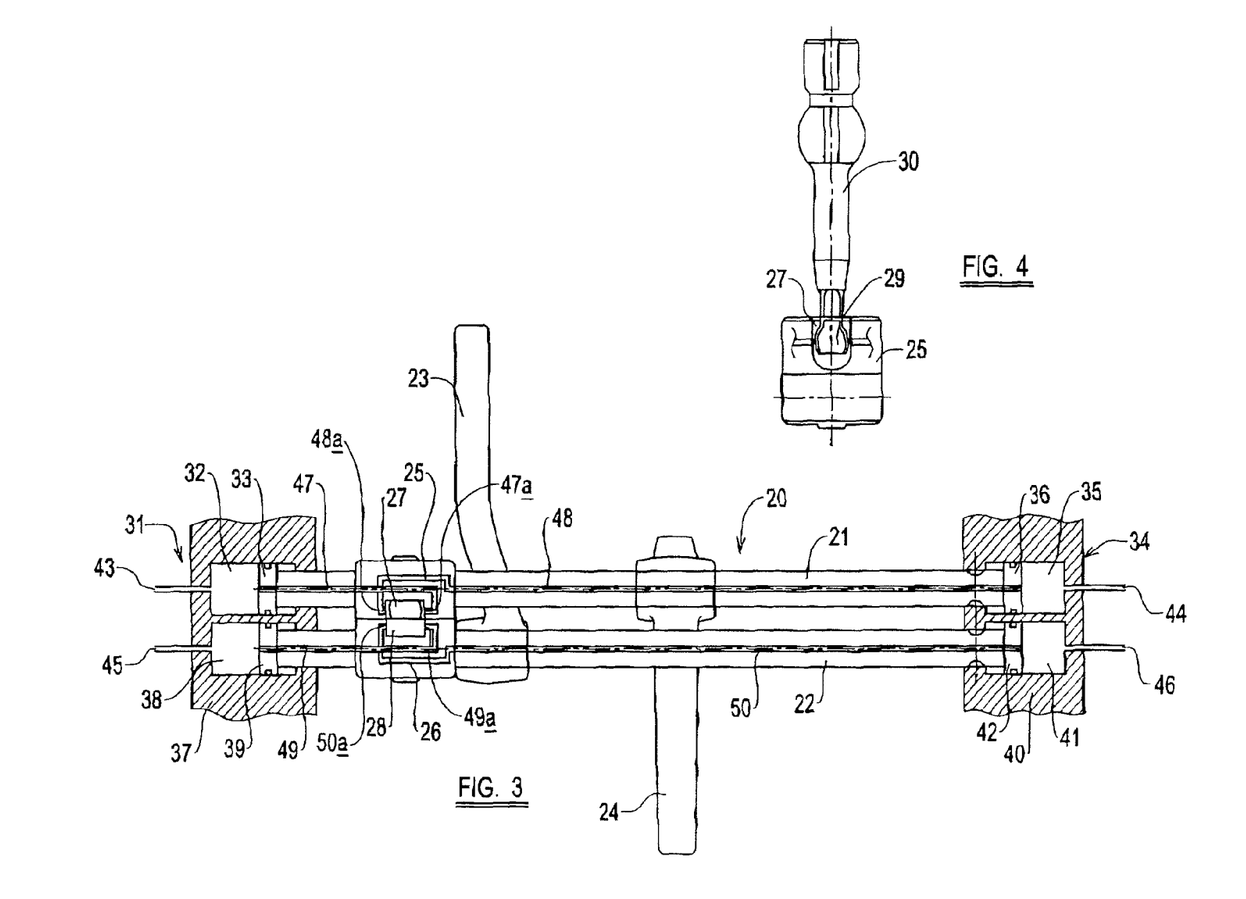
FIG. 3 is a plan view of part of a gear shift mechanism embodying the present invention.
FIG. 4 is a side view of a part of the gear shift mechanism of FIG. 2.

Referring now to FIGS. 3 and 4, a gear shift mechanism is shown for operating the clutches 17, 18. The gear shift mechanism 20 comprises a first shift rail 21 and a second shift rail 22, each of the shift rails being mounted for axial movement. Each of the shift rails 21, 22 has a shift fork 23, 24 respectively attached thereto to cause operation of the clutches 17, 18 respectively. The shift rails are located within the casing in the position generally shown at 19 in FIG. 1.

To enable the operator to slide the shift rails 21, 22, each of the shift rails 21, 22 has a control part comprising a shift block 25, 26 respectively. The shift blocks 25, 26 have recesses 27, 28 in an upper surface thereof, in which an end part 29 of a control lever generally shown at 30 in FIG. 4 is received. By appropriate movement of the gear lever, the control linkage 30 engages one base of the recess 27, 28 and acts on it to move the respective shift rail 21, 22 in an axial direction to operate the clutches as desired.

As shown in FIG. 3, a fluid pressure actuator is provided on each shift rail to apply a force to the shift rail in response to operation of the operator control. The first shift rail 21 has a first fluid pressure actuator generally shown at 31 comprising a cylinder 32 in which a piston 33 connected to an end part of the first shift rail is attached. The first shift rail further has a second fluid pressure activator 34 comprising a cylinder 35 and a piston 36 moveable in the cylinder 35 and mounted on an end part of the first shift rail 21. Similarly, the second shift rail 22 at one end has a third fluid pressure actuator generally shown at 37 comprising a cylinder 38 within which a piston 39 is moveably received, the piston 39 being attached to an end of the second shift rail 22. The second shift rail 22 further has a fourth fluid pressure actuator generally shown at 40 comprising a cylinder 41 within which a piston 42 is slidably moveable and is connected to the other end of the second shift rail 22. Each of the first, second, third and fourth fluid pressure actuators 31, 34, 37, 40 has a corresponding inlet 43, 44, 45, 46 for connection to a source of fluid under pressure, in this example, hydraulic fluid. The first shift rail 21 has a first internal bore 47 and a second internal bore 48. The first internal bore 47 leads from the left hand end of the shift rail 21 as seen in FIG. 3 to an outlet 47a on the right hand face of recess 27, while the second internal bore leads from the right hand end of the first shift rail 21 as shown in FIG. 3, to an outlet 48a on the left hand face of recess 27. Similarly, second shift rail 22 has a third internal bore 49 and a fourth internal bore 50. The third internal bore 49 leads from the left hand end of the second shift rail 22 as shown in FIG. 3 to an outlet 49a on the right hand face of recess 28. The fourth internal bore 50 extends from the right hand end of the second shift rail 22 to an outlet 50a on the left hand face of the recess 28. Consequently, when the outlets 47a, 48a, 49a, 50a, are unobstructed, each of the cylinders 32, 35, 38, 41 is supplied with hydraulic fluid under pressure on the respective connection 43, 44, 45, 46, and the fluid under pressure passes along the corresponding internal bore 47, 48, 49, 50 where it vents through the corresponding outlet. Accordingly, when the gear lever is in its neutral position, i.e. is not engaging either face of either recesses 27, 28 the supply of fluid pressure to the respective fluid pressure actuator 31, 34, 37, 40 results in no net force being applied to the respective shift rail 21, 22.

In operation, when the operator moves the gear shift lever to select a desired gear, the control linkage 30 will be moved within one of the recesses 27, 28 and engage a end face, to cause axial movement of the shift rails 21, 22 and corresponding movement of the appropriate shift from 23, 24 to operate the clutch. The end part 29 of the control lever 30, in contacting the end face of the recess 27, 28, will close the outlet 47a, 48a, 49a, 50a in that face of the recess 27, 28. By closing the outlet, the flow of fluid under pressure from the corresponding cylinder 32, 35, 38, 41 will be blocked or restricted, causing a pressure increase in that cylinder and a resulting force on the corresponding piston 33, 36, 39, 42 applying a further axial force to the shift rail 21, 22 in the direction of movement of the control lever 30. So for example, when it is desired to move the first shift rail 21 to the left as shown in FIG. 3, the control linkage 30 is moved to bring the end part 29 into engagement with the left hand face of the recess 27. In doing so, the outlet 48a connected to the second internal bore 48 will be closed, thus restricting the escape of fluid under pressure from cylinder 35, increasing the pressure within the cylinder 35 and causing a corresponding force to be applied to the piston 36, urging the shift rail 21 to the left. Because the outlet 47a will be unobstructed, the flow of fluid under pressure from cylinder 32 through internal bore 47 will not be hindered, and so there will be no substantial resistance to the movement of the shift rail 21 to the left due to fluid within the cylinder 32.

The end part 29 of the control linkage 30 does not need to create a complete seal with the outlet 47a, 48a, 49a, 50a, but needs simply obstruct the outlet sufficiently to provide a back pressure within the corresponding cylinder 32, 35, 38, 41.

In the present example, the force applied by the driver through the shift rail and shift fork is about 800 Newtons, and the fluid pressure actuators supply a further 400 Newtons of force. The increase in force will reduce the time taken for the mating surfaces of the clutches 17, 18 to synchronise and engage, reducing the time taken for a gear change and the apparent force required to be applied by the operator, thus improving operator control and feel of the vehicle. The fluid pressure actuators can advantageously be provided as part of the case of the transmission 10, and as the mechanism is compact and requires no external control, it may be provided relatively simply and inexpensively without requiring any increase in the overall envelope of the transmission. Advantageously, where the transmission has a hydraulic pump integrally provided, as shown in at 60 in FIG. 2, the fluid pressure supplied to the fluid pressure actuators may come from that fluid pressure source. If it is desired not to divert fluid pressure from other functions when no gear is being selected, an appropriate valve may be provided so that no fluid under pressure is supplied to actuators 31, 34, 37, 40 during normal operation, but when a gear change is required, for example when the operator disconnects a master clutch, then fluid pressure may be applied to the actuators and the gear shift mechanism operated as discussed herein before.

Although the configuration described herein shows the end part of each shift rail supporting a piston moveable within a cylinder, it will be apparent that fluid pressure actuators may be provided otherwise as desired, for example as separate cylinders and pistons which are drivingly connected between the shift rail and a fixed part of the casing, or by the end part of the shift rail comprising a cylinder as part of an internal bore and a piston being mounted in that cylinder fixed relative to the casing, or indeed otherwise as desired. Although the system shown above has two shift rails, it may be provided with one, two, three or more shift rails as desired, or required by the number of gears provided in the transmission.

Figure 5:
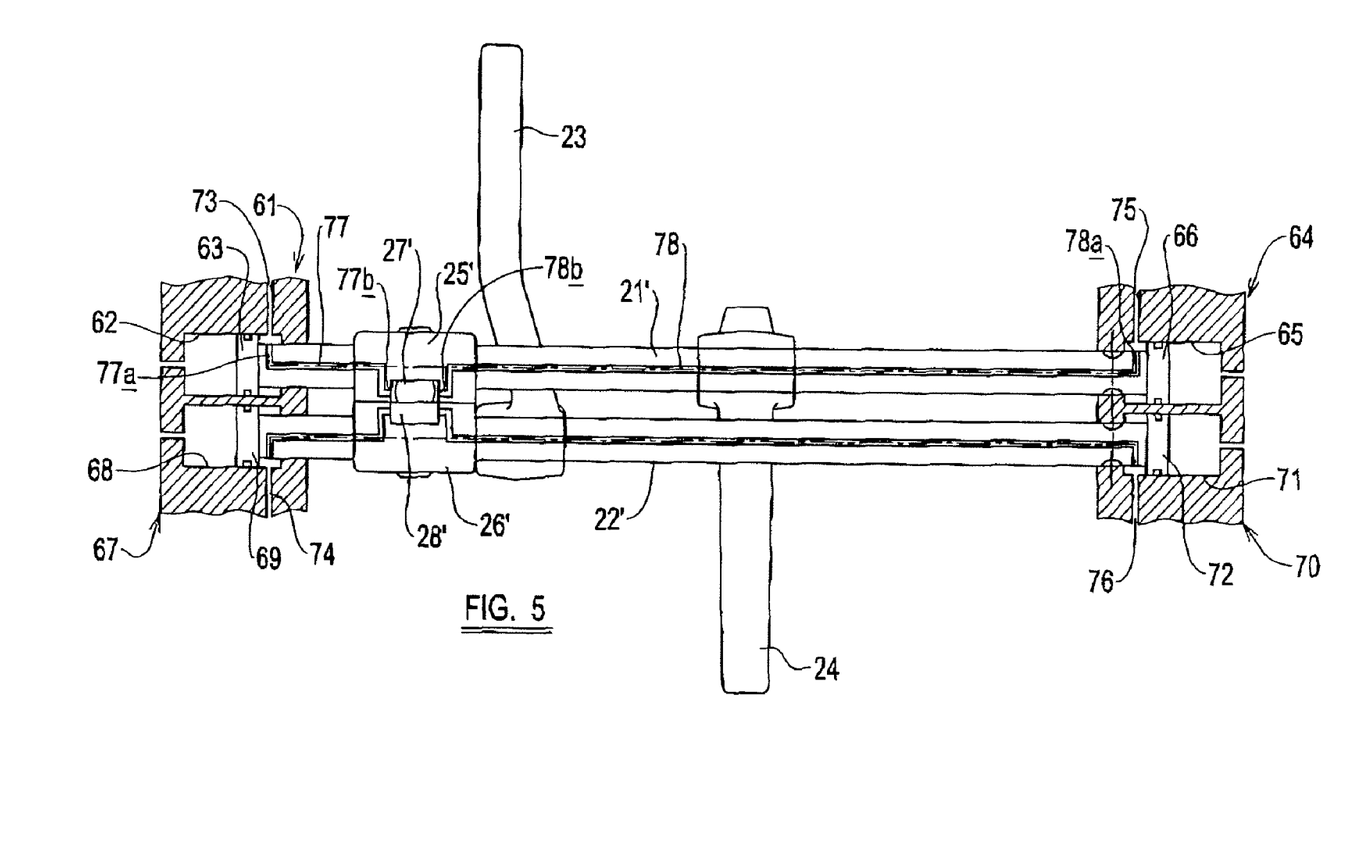
FIG. 5 is a plan view similar to FIG. 3 showing a further gear shift mechanism.

An alternative system embodying the present Invention is illustrated in FIG. 5. The system is similar to that disclosed in FIG. 4, with the exception of the internal bores which are configured to not require a cross-over as shown in FIG. 3. Referring to FIG. 5, the shift rails are shown at 21', 22' supporting shift forks 23, 24 in like manner to the shift forks of FIG. 3. The first shift rail 21' has a first fluid pressure actuator generally shown at 61 comprising a cylinder 62 in which a piston 63 is slidably movable. The first shift rail 21' further has a second fluid pressure activator 64 comprising a cylinder 65 and a piston 66 moveable in the cylinder 35 mounted on an end part of the first shift rail 21'. Similarly, the second shift rail 22' has a third fluid pressure actuator generally shown at 67 comprising a cylinder 68 within which a piston 69 is slidably movable and attached to an end part of the second shift rail 22'. The second shift rail 22' further has a fourth fluid pressure actuator generally shown at 70 comprising a cylinder 71 within which a piston 72 is slidably movable and is mounted to the other end of the second shift rail 22'. Each of the fluid pressure actuators 61, 64, 67, 70 has a corresponding inlet 73, 74, 75, 76 for a connection to the source of fluid under pressure. However, in contrast to the embodiment of FIG. 3, the inlets 73, 74, 75, 76 are connected to the annular end of the respective cylinder 62, 65, 68 and 71, and consequently act on the face of the piston 63, 66, 69, 72 to which the respective shift rail 21', 22' is connected. Thus, the pressure within the cylinders 62, 68 will be acting to urge the respective shift rail 21', 22' to the left, whilst the pressure within cylinders 65, 71 will be acting to urge the respective shift rail 21', 22' to the right.

In like manner to the embodiment of FIG. 3, the shift rails 21', 22' have a respective shift block 25', 26' connected thereto and comprising a corresponding recess 27', 28' to receive an end part of the control lever 30. In the embodiment of FIG. 5, the first shift rail 21' has a first internal bore 77 leading from an inlet 77a in flow communication with the cylinders 62 to an outlet 77b provided in the left hand phase of the recess 27'. The first shift rail 21' has a second internal bore 78 leading from an inlet 78a in flow communication with the cylinder 65 to an outlet 78b in the right hand side wall of the recess 27'. The second shift rail 22' has a similar pair of internal bores. Consequently, movement of the control linkage will close one of the outlets and cause a corresponding pressure increase in the corresponding cylinder 62, 65, 68, 71, urging the respective shift rail 21', 22' to move the direction required by the operator. For example, when the end 29 of the control linkage 30 is moved to the left In the first recess 27', it will close the outlet 77b, thus preventing or hindering fluid from leaving the cylinder 62 and causing the pressure within the cylinder 62 to act on the piston 63 urging the shift rail 21' to the left and thus assisting the movement of the shift rail 21' in a similar manner to the embodiment of FIG. 3. Consequently, the same assistance is provided with the operator when changing gear, but without needing to engineer the shift blocks 25', 26' to provide a cross-over of the Internal bores as shown in FIG. 3.

Figures 6, 7:
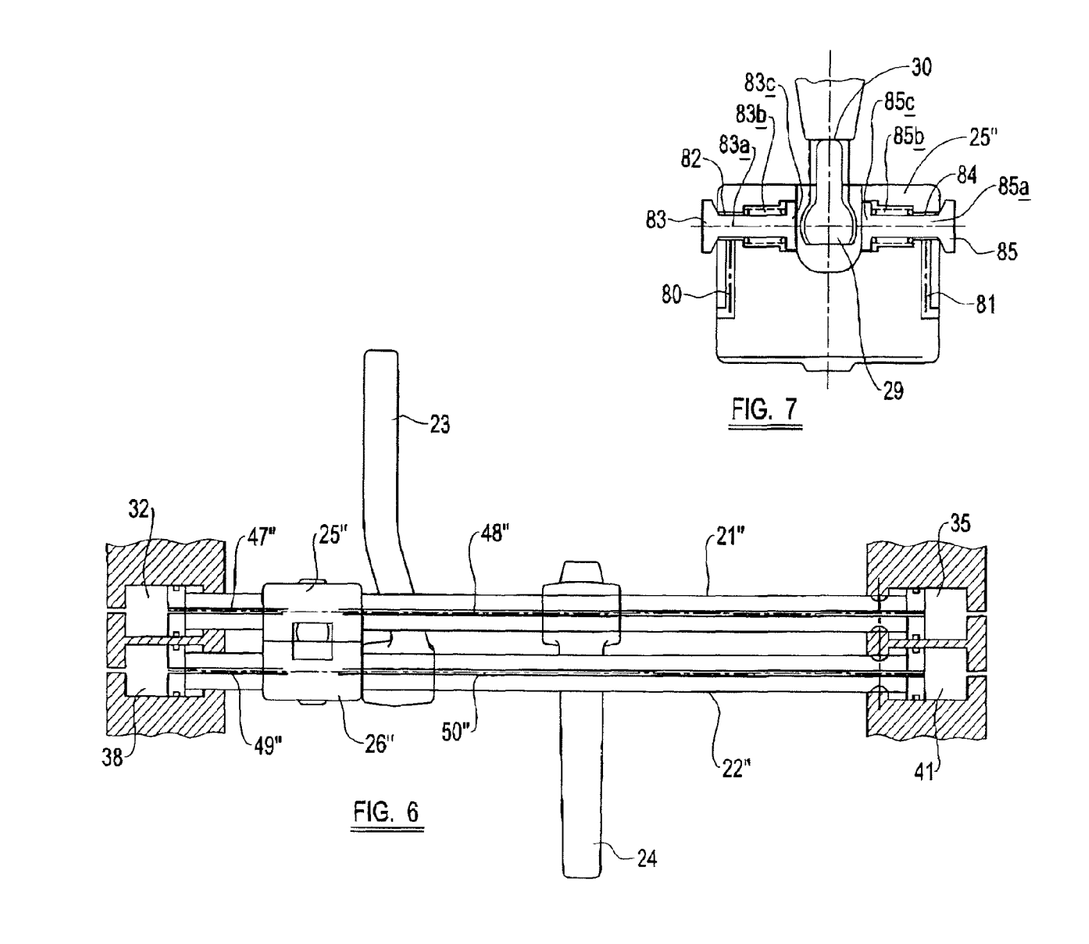
FIG. 6 is a plan view similar to FIG. 3 showing a still further gear shift mechanism.
FIG. 7 is a view in more detail of the part of the mechanism in FIG. 6.

A yet further embodiment is shown in FIGS. 6 and 7. Referring to FIG. 6, the shift rails 21", 22" support shift forks 23, 24 in like manner to the embodiment of FIG. 3, and pressure is supplied to cylinders 32, 35, 38 and 41 to act on a piston provided by the end face of the respective shift rail 21", 22".

The shift rails 21", 22" have a respective shift block 25", 26" attached thereto. The first shift rail 21" has a first internal bore 47" and a second internal bore 48" in like manner to the embodiment of FIG. 3, and the second shift rail 22" has a third internal bore 39" and a fourth internal bore 50", again in like manner to the embodiment of FIG. 3. Referring now to FIG. 7, one of the shift blocks 25" is shown in more detail in sectional view. The shift block 25" has a first inlet 80 which is in flow communication with the first internal bore 47", and a second inlet 81 which is in flow communication with the second internal bore 48". A first fluid outlet is provided at 82 which is closed by a first valve mechanism 83. A second fluid outlet 84 is provided closed by a second valve 85. Each of the valves 83, 85 comprise a valve element 83a, 85a which acts to close the respective fluid outlet 82, 84 and is biased to a closed position by a respective biasing element 83b, 85b. The valve elements 83, 85 are provided with a respective end face 83c, 85c, for engagement with the end 29 of the control linkage 30. Accordingly, it will be apparent that when the end of the control linkage is moved to the left or right as shown in FIG. 7, it will act on the end face 83c, 85c of the respective valve element 83, 85 and connect the respective inlet 80, 81 to the respective fluid outlet 82, 84, thus connecting the respective internal bore 47", 48" to atmosphere and so causing the pressure to fall in the corresponding cylinder 32, 35. Because the other cylinder 32, 35 will remain at a relatively higher pressure, there will be a corresponding force applied to the shift rail 21" acting to urge it to the left or the right as seen in FIG. 6 by virtue of movement of the control linkage 30. The second shift block 26" has the same structure and means of operation as the first shift block 25".

Although the system described herein is intended for use with the hydraulic fluid, it will be apparent that the fluid under pressure may comprise pneumatic pressure or any other fluid if desired and appropriate.

In the present specification "comprise" means "includes or consists of" and "comprising" means "including or consisting of".

The features disclosed In the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A power-assisted gearshift mechanism for a manual transmission, comprising;
   a shift rail mounted for axial movement to select one or more gears;
   a control arm engageable with the shift rail to cause axial movement of the shift rail in response to operation of a operator control;
   and a fluid pressure actuator;
   the fluid pressure actuator comprising a piston moveable in a cylinder, wherein fluid pressure in the cylinder causes force to be applied to the shift rail;
   the cylinder having a fluid supply connection and a fluid exit connection, and wherein the fluid exit connection is closeable to cause the fluid pressure within the cylinder to change; and
   the fluid exit connection comprising a bore within the shift rail;
   wherein movement of a control linkage is operable to open or close the bore.

2. A power-assisted gearshift mechanism according to claim 1 wherein the fluid exit connection is closeable to cause the fluid pressure within the cylinder to increase.

3. A power-assisted gearshift mechanism according to claim 1 wherein the control arm comprises an end part engageable with a control part of the shift rail and wherein movement of the end part closes an outlet of the bore.

4. A power-assisted gearshift mechanism according to claim 3 wherein the control part comprises a block having a recess in which the end part of the control linkage is received and wherein the outlet of the bore is located with the recess.

5. A power-assisted gearshift mechanism according to claim 3 wherein the fluid exit connection is closeable to cause the fluid pressure within the cylinder to increase.

6. A power-assisted gearshift mechanism according to claim 1, wherein the control arm comprises an end part engageable with a control part of the shift rail, wherein the control part comprises a valve mechanism operable to close an outlet of the bore, and wherein movement of the end parts acts on the valve mechanism to open the outlet of the bore.

7. A power-assisted gearshift mechanism according to claim 1 wherein an end part of the shift rail provides part of the fluid pressure actuator.

8. A power-assisted gearshift mechanism according to claim 7 wherein the end part of the actuator comprises the piston moveably mounted within the cylinder.

9. A power-assisted gearshift mechanism according to claim 1 comprising two fluid pressure actuators, each fluid pressure actuator operable to apply an axial force to the shift rail in an opposite direction.

10. A power-assisted gearshift mechanism according to claim 1 comprising two shift rails, each shift rail being moveable by the control arm.

11. A transmission comprising a casing, an input and an output, a gearbox having a plurality of clutches and a gearshift mechanism, the gearshift mechanism comprising:
- a shift rail mounted for axial movement to select one or more gears;
- a control arm engageable with the shift rail to cause axial movement of the shift rail in response to operation of a operator control;
- and a fluid pressure actuator;
- the fluid pressure actuator comprising a piston moveable in a cylinder, wherein fluid pressure in the cylinder causes force to be applied to the shift rail;
- the cylinder having a fluid supply connection and a fluid exit connection, and wherein the fluid exit connection is closeable to cause the fluid pressure within the cylinder to change; and
- the fluid exit connection comprising a bore within the shift rail;
- wherein movement of a control linkage is operable to open or close the bore;
- the gearshift mechanism being operable to cause operation of the clutches to provide a drive path between the input and the output.

12. A transmission according to claim 11 wherein the clutches comprise synchromesh clutches.

13. A transmission according to claim 12 comprising a supply of hydraulic fluid under pressure, wherein the hydraulic fluid is supplied to the fluid pressure actuator.

14. A transmission according to claim 11 comprising a supply of hydraulic fluid under pressure, wherein the hydraulic fluid is supplied to the fluid pressure actuator.

\* \* \* \* \*